June 21, 1960  A. C. JERMYN  2,941,295
INSERTS FOR ARTIFICIAL TEETH
Original Filed May 21, 1956  2 Sheets-Sheet 2
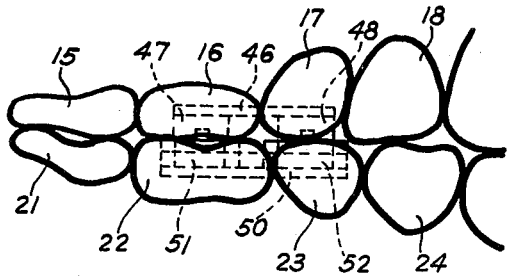
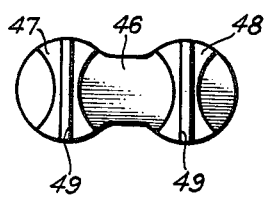
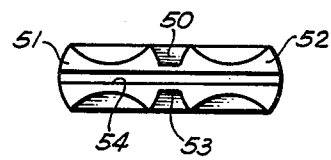
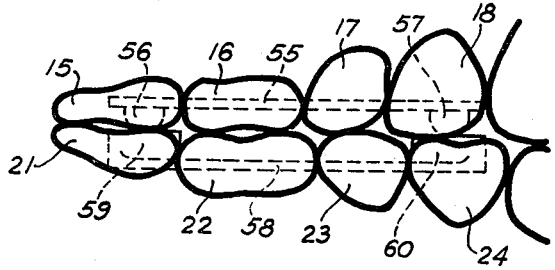
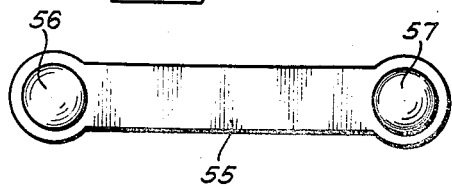
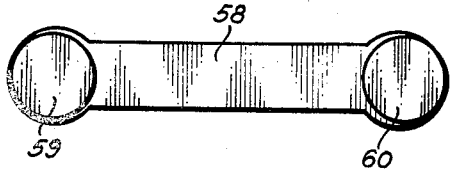
ARTHUR C. JERMYN
INVENTOR.
BY *George A. Gillette Jr.*
ATTORNEY.

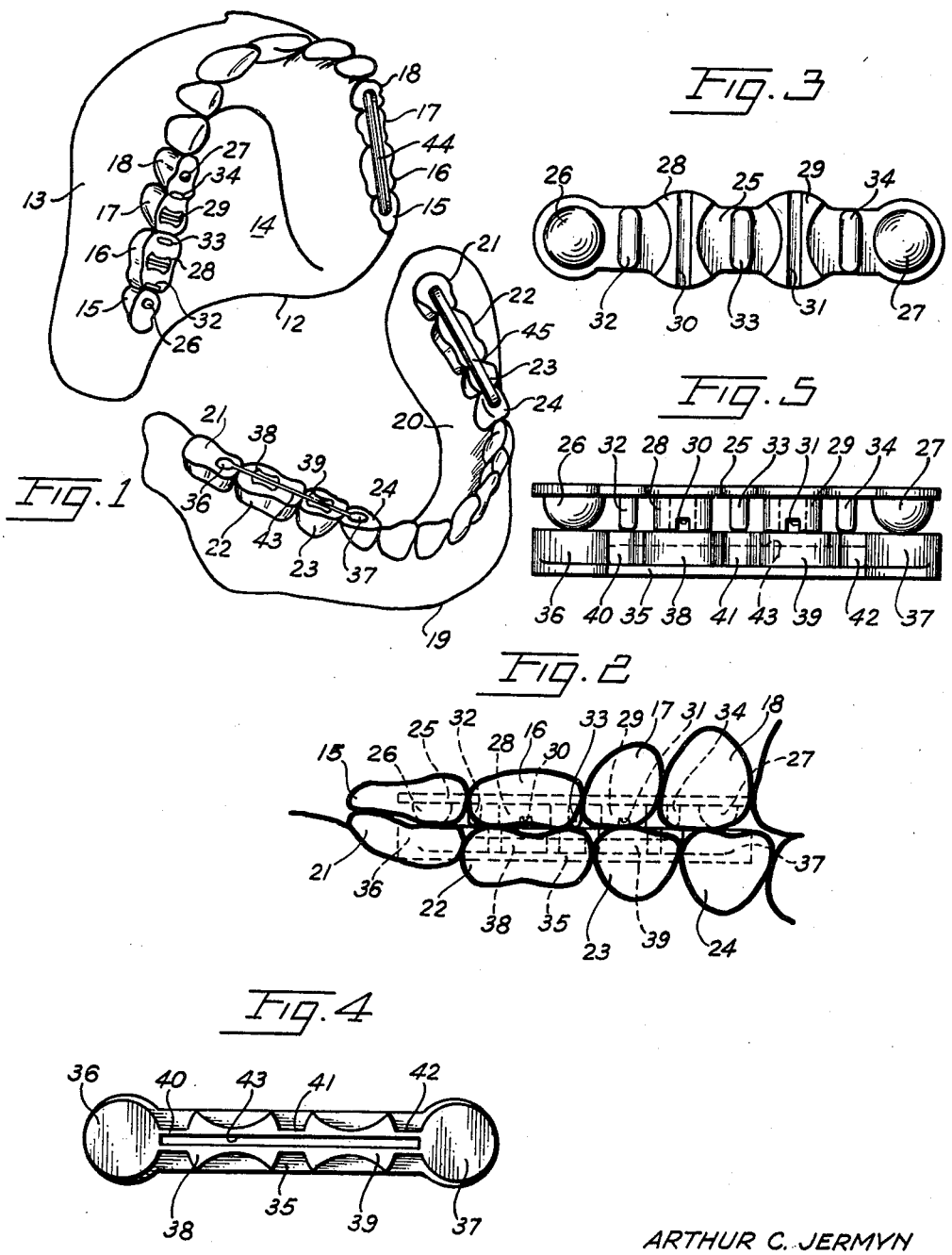
June 21, 1960 A. C. JERMYN 2,941,295
INSERTS FOR ARTIFICIAL TEETH
Original Filed May 21, 1956 2 Sheets-Sheet 1
ARTHUR C. JERMYN
INVENTOR.
ATTORNEY.

United States Patent Office 2,941,295
Patented June 21, 1960

2,941,295

INSERTS FOR ARTIFICIAL TEETH

Arthur C. Jermyn, 27 Orchard Drive, Rochester, N.Y.

Substituted for abandoned application Ser. No. 586,260, May 21, 1956. This application Nov. 7, 1957, Ser. No. 695,174

8 Claims. (Cl. 32—2)

The present invention relates to inserts for artificial teeth and more particularly to a plurality of such inserts which are simultaneously embedded in the artificial teeth and to dispensable patterns for said inserts and this application is a substitute application corresponding to Serial No. 586,260, filed May 21, 1956, now abandoned.

It is well known that the life and efficiency of artificial teeth may be lengthened and improved by the provision of hard inserts, as for example the dental masticators disclosed and claimed in my United States Patent No. 2,746,148 issued May 22, 1956. Moreover, the masticating action of inserts is improved by the provision of occlusal plane determining members and/or by the provision of a plurality of masticators. However, the time and difficulty of embedding such a plurality of inserts in the artificial teeth is often a factor in the decision of a patient and/or a dentist against their use.

The primary object of the present invention is the simultaneous embedding of a plurality of dental inserts into artificial teeth, which not only shortens the time of insertion but also improves the accuracy with which such inserts are embedded in the artificial teeth.

Another object of the invention is the provision of a plurality of pairs of masticators and/or occlusal plane determining members which are simultaneously mounted in the artificial teeth.

A further object of the invention is the provision of dispensable patterns for the inserts so that the inserts may be made by the dentist or laboratory technician according to known methods.

Other and further objects of the invention will be suggested to those skilled in the art by the disclosure which follows.

Reference is hereby made to the accompanying drawings wherein like reference characters designate similar elements and wherein:

Fig. 1 is an elevation of a set of artificial teeth which have been slotted to receive inserts, and in which inserts, according to the invention, have been embedded.

Fig. 2 is a fragmentary side elevation of a set of artificial teeth containing inserts according to the invention.

Fig. 3 is a bottom elevation of the insert, or the pattern for the insert, preferably placed in the upper plate.

Fig. 4 is a top elevation of the insert, or the pattern for the insert, preferably placed in the lower plate.

Fig. 5 is a side elevation of the inserts of Figs. 3 and 4 shown in contact with each other.

Fig. 6 is a fragmentary side elevation of a set of artificial teeth containing inserts like those shown in Figs. 7 and 8.

Fig. 7 is a bottom elevation of an insert composed of a pair of spaced masticator halves, preferably for an upper plate.

Fig. 8 is a top elevation of an insert composed of a pair of spaced masticator halves complementary to those of Fig. 7 and preferably for a lower plate.

Fig. 9 is a fragmentary side elevation of a set of artificial teeth containing inserts like those shown in Figs. 10 and 11.

Fig. 10 is a bottom elevation of an insert composed of a pair of spaced occlusal plane determining members, preferably for an upper plate.

Fig. 11 is a top elevation of an insert composed of a pair of plane spaced occlusal plane determining members, preferably for a lower plate.

The preferred embodiment of my invention is shown in Figs. 1 to 5 inclusive and Figs. 1, 2, 6 and 9 show how the preferred and modified forms of the invention are applied to sets of artificial teeth. The set of artificial teeth comprises an upper plate 12 having a gum portion 13 and a palate 14 simulating the corresponding natural parts of the mouth and includes a series of artificial teeth such as molars 15 and 16 and bicuspids 17 and 18. The lower plate 19 comprises a gum portion 20 and includes a series of artificial teeth such as molars 21 and 22 and biscuspids 23 and 24.

A pair of inserts according to the invention are embedded preferably in each set of teeth and particularly in the posterior tooth area. One of such inserts, see particularly Fig. 3, comprises an elongated base portion 25, a pair of hemispherical occlusal plane determining members 26 and 27 at opposite ends of said base portion 25, a pair of intermediately spaced masticator members 28 and 29 each of which may be provided with a transverse groove 30 and 31, respectively, and intermediate deflector members 32, 33 and 34. The other insert, see particularly Fig. 4, comprises an elongated base portion 35, a pair of cylindrical occlusal plane determining members 36 and 37, preferably having plane circular faces, and located at opposite ends of said base portion 35, and a pair of masticator members 38 and 39 in spaced relation therebetween. As best shown in Figs. 4 and 5, longitudinal deflector members 40, 41 and 42 are respectively between occlusal plane determining member 36 and masticator member 38, between masticator members 38 and 39, and between masticator member 39 and occlusal plane determining member 37, and said deflector members 40, 41 and 42 and masticator members 38 and 39 may be provided with a longitudinal groove 43, as best shown in Fig. 4.

The manner of embedding the inserts in the artificial teeth will now be described. The occlusal surfaces of the molars 15 and 16 and bicuspids 17 and 18 are provided with an elongated slot 44, see upper portion of Fig. 1, and the molars 21 and 22 and bicuspids 23 and 24 of the lower plate are provided with an elongated slot 45. Such slots 44 and 45 may be cut into the artificial teeth with dental drills and are made large enough to receive the base portions 25 and 35 of the inserts and are deep enough so that the contact points and surfaces of the occlusal plane determining members and dental masticators are approximately on the occlusal plane of the set of teeth when said base portions 25 and 35 are in the bottoms of said slots 44 and 45. Self-curing plastic is placed into the slots 45 in the teeth of the lower plate 19 and the inserts having a plurality of occlusal plane determining members and masticator members thereon are placed in each slot with the faces of each on the occlusal plane. After the plastic cement is completely hardened, the excess material is cut away, and the remaining plastic is ground to obtain the desired shape and appearance of the teeth. Subsequently, self-curing plastic is placed in the slots 44 in the upper plate 12, the inserts with occlusal plane determining members and masticator members are placed therein and the teeth closed into centric, either within or out of the patient's mouth, and the flat planes of the masticators and occlusal locating members are in correct vertical and centric positions. Again after the plastic is completely hardened, excess plastic is cut away and the plastic is ground until the correct esthetic shape and appearance of the teeth are obtained.

It may be found desirable to embed the inserts into the opposite teeth successively, rather than simultaneously as just described. The actual order of insertion is not important and may vary from dentist to dentist and from patient to patient. The important accomplishment made possible by the invention is that one insert carries all of the occlusal plane determining members, masticating members and deflector members for each of the masticatory areas of the teeth so that several such members as are desired are embedded into the teeth by one insertion.

Fig. 2 illustrates the optimum contact points and surfaces obtained by such multiple integration of the occlusal plane locating members and masticator and deflector members. The lower insert having base portion 35 is embedded within the molars 21 and 22 and within the bicuspids 23 and 24 so that the plane circular faces of the cylindrical occlusal plane determining members 36 and 37 and the faces of the masticating members 38 and 39, which are all in the same plane by virtue of the construction of the insert, are positioned so as to coincide with the occlusal plane of the teeth. Then by the technique described before, the other insert having base portion 25 is embedded in the molars 15 and 16 and bicuspids 17 and 18 of the upper plate 12 so that the points of contact of hemispherical occlusal plane determining members 26 and 27 and the grooved faces of masticator members 28 and 29, which are in a common plane, coincide with the occlusal plane of the teeth and simultaneously engage the planes of the locating and masticating members of the opposite insert. Not only does such multiple provision of the occlusal plane locating and masticating members considerably reduce the time over that which would be required to insert each of them individually but the planes or contact points of the respective members on the insert are mechanically made in the same plane before insertion and the dentist needs merely to embed the insert so that the planes or contact points are in the occlusal plane of the teeth to obtain a result that would otherwise only be possible by the most accurate and painstaking technique requiring many times the time needed for the insertion according to the invention.

The advantages of ball-point balanced occlusion are explained in detail in my paper entitled "Ball-Point Balanced Occlusion in the Implant Denture" which was presented by me at the Third International Dental Congress, Mexico City, Mexico, on October 27, 1955, and which was published in The Journal of Implant Dentistry, vol. 2, No. 1, November 1955. The individual masticators there described will be recognized as of the type disclosed and claimed in my United States Patent 2,746,158 issued May 22, 1956. My aforementioned paper also describes maintaining the proper vertical dimension of the artificial teeth by provision therein of masticators and/or occlusal plane determining members.

Other variations of the multiple provision of occlusal plane determining members and/or masticator members are within the purview of my invention. One such variation being shown in Figs. 6-8 and another in Figs. 9-11, inclusive.

Multiple provision and insertion of dental masticators may be accomplished by means of the inserts shown in Figs. 7 and 8. One such insert comprises a base portion 46 and a pair of dental masticators 47 and 48 in spaced relation near opposite ends of said base portion 46. Each of said masticators 47 and 48 is provided with a groove 49 extending buccolingually thereof. The other insert comprises a base portion 50 having a pair of dental masticators 51 and 52 in spaced relation thereon, connected by a deflector 53 and provided with a longitudinal groove 54 extending mesiodistally of the teeth when inserted. The masticators 47 and 48 may be of other shapes or forms, the important fact according to the invention is that they are provided in gangs upon the inserts so that they can be embedded simultaneously into each masticatory area of the teeth. As shown in Fig. 6 when the inserts are placed in the artificial teeth by a suitable technique, such as that previously described, the occlusal faces of the masticators 47, 48, 51 and 52 make surface contact with each other at the occlusal plane of the teeth.

Multiple provision and insertion of the occlusal plane determining members may be accomplished by means of the inserts shown in Figs. 10 and 11. One such insert comprises a base portion 55 having a pair of hemispherical occlusal plane determining members 56 and 57 in spaced relation near opposite ends of said base portion 55. The other insert comprises a base portion 58 having a pair of cylindrical occlusal plane determining members 59 and 60 in spaced relation on and at opposite ends of said base portion 58. The occlusal plane determining members 56 and 57 may have other shapes which give a minimum frictional engagement with the occlusal faces of the members 59 and 60. As shown in Fig. 9, embedding the inserts just described results in an optimum location of the occlusal plane determining members 56, 57, 59 and 60 and so that the contact points of the members 56 and 57 are centrically of the members 59 and 60 permitting the maximum eccentric excursions during chewing with the teeth.

While the inserts hereinbefore described are preferably made of stainless steel, they can obviously be made of any other relatively hard corrosion-resistant metal or material. Since that will require a relatively expensive inventory or will increase mailing and shipping charges for the inserts, it may be described to provide the inserts in all the shapes and forms disclosed and described but composed of a low-ash plastic material so that the dentist or the dental laboratory may by known methods produce or mold the inserts out of any metal or material used for other dental parts, inlays or inserts. One such low-ash plastic is polystyrene which is generally available commercially.

Those skilled in the art will immediately recognize the advantages of the multiple or gang type inserts for simultaneously embedding a plurality of occlusal plane determining members and/or a plurality of dental masticators in a set of artificial teeth. Several variations of the inserts beyond those shown are possible without departing from the spirit of the invention so that the scope of my invention is not to be limited by the disclosure but is to be as defined by the claims which follow.

Having now described my invention, what I desire to secure by Letters Patent of the United States and what I claim is:

1. A set of artificial teeth including a lower plate and an upper plate, comprising a plurality of pairs of occlusal plane determining members and a plurality of pairs of dental masticators, all made of material which is hard relative to the artificial teeth, a plurality of the occlusal plane determining members and of the masticators in one plate being integrally formed and simultaneously embedded in said one plate, and a plurality of the occlusal plane determining members and of the masticators in the other plate being integrally formed and simultaneously embedded in said other plate and arranged to cooperate with each other when said teeth are moved for chewing.

2. A set of artificial teeth including a lower plate and an upper plate, comprising a pair of dental masticators each having plane occlusal masticating faces and mounted respectively in the teeth of said upper and lower plates so that said plane occlusal masticating faces contact each other when said teeth are in closed position, and a pair of occlusal plane determining members mounted respectively in the teeth of said upper and lower plates and both made of material which is hard relative to the artificial teeth, one of said members having a plane occlusal face adjacent one of said masticators and the other of said members being formed to make a low friction contact with said plane occlusal face when said teeth are in closed position.

3. A set of artificial teeth including a lower plate and an upper plate, comprising a plurality of pairs of dental masticators made of material which is hard relative to the artificial teeth and each having plane occlusal masticating faces, a plurality of dental masticators in one plate being integrally formed and simultaneously mounted therein, and the plurality of dental masticators in the other plate being integrally formed and simultaneously mounted therein so that the respective plane occlusal masticating faces are all in juxtaposition to each other when said teeth are in closed position.

4. A set of artificial teeth including a lower plate and an upper plate, comprising a plurality of pairs of occlusal plane determining members made of material which is hard relative to the artificial teeth, a plurality of the occlusal plane determining members in one plate being integrally formed and simultaneously embedded in said one plate and each such said members having a plane occlusal face, and a plurality of the occlusal plane determining members in the other plate being integrally formed and simultaneously embedded in said other plate in juxtaposition to each of the first mentioned members when said teeth are in closed position and each such said member being formed to make a low friction contact with the juxtaposed plane occlusal faces when said teeth are in closed position.

5. As an article of manufacture, an insert for artificial teeth and composed of a material which is hard relative to said teeth, comprising a base portion, a pair of occlusal plane determining members thereon, a pair of dental masticators on said base portion, and deflector members on said base portion and each between said occlusal plane determining members and said dental masticators.

6. As an article of manufacture, an insert for artificial teeth and composed of a material which is hard relative to said teeth, comprising a base portion, a pair of occlusal plane determining members thereon adjacent opposite ends thereof, and a dental masticator between said occlusal plane determining members.

7. As an article of manufacture, an insert for artificial teeth and composed of a material which is hard relative to said teeth, comprising a base portion having a pair of occlusal plane determining members in spaced relation thereon.

8. As an article of manufacture, an insert for artificial teeth and composed of a material which is hard relative to said teeth, comprising a base portion having a pair of dental masticators in spaced relation thereon.

References Cited in the file of this patent

UNITED STATES PATENTS

| | | |
|---|---|---|
| 2,348,935 | Smith | May 16, 1944 |
| 2,369,892 | Greneker | Feb. 20, 1945 |
| 2,746,148 | Jermyn | May 22, 1956 |
| 2,776,485 | Stuart | Jan. 8, 1957 |